United States Patent [19]

Lederman

[11] Patent Number: 4,993,528
[45] Date of Patent: Feb. 19, 1991

[54] MULTIPLE ROW ROLLER CLUTCH WITH ROLLER CONTROL CARS

[75] Inventor: Frederick E. Lederman, Sandusky, Ohio

[73] Assignee: General Motors Corporation, Detroit, Mich.

[21] Appl. No.: 519,524

[22] Filed: May 4, 1990

[51] Int. Cl.⁵ .................. F16D 15/00; F16D 41/06
[52] U.S. Cl. .................... 192/45; 192/41 R
[58] Field of Search .................... 192/41 R, 45

[56] References Cited

U.S. PATENT DOCUMENTS

| | | | |
|---|---|---|---|
| 3,087,590 | 4/1963 | Gorsky | 192/45 |
| 3,888,137 | 6/1975 | Brieten | 192/45 |
| 4,664,237 | 5/1987 | Lederman et al. | 192/45 |
| 4,821,856 | 4/1989 | Lederman | 192/45 |
| 4,850,464 | 7/1989 | Doller et al. | 192/45 |
| 4,893,702 | 1/1990 | Lederman | 192/45 |
| 4,901,833 | 2/1990 | Lederman | 192/45 |

Primary Examiner—Rodney H. Bonck
Assistant Examiner—Nicholas Whitelaw
Attorney, Agent, or Firm—Patrick M. Griffin

[57] ABSTRACT

A specially designed roller control car for a roller clutch retains a pair of rollers to the clutch prior to installation, and continually applies a substantially equal share of the force of a single spring to each of the pair of rollers after installation, so as to allow each roller to independently seek its own, unique ready position.

2 Claims, 3 Drawing Sheets

MULTIPLE ROW ROLLER CLUTCH WITH ROLLER CONTROL CARS

This invention relates to roller clutches in general, and specifically to a roller clutch that has roller control cars specially designed to handle multiple rows of rollers.

BACKGROUND OF THE INVENTION

Recent developments in overrunning roller clutches by the assignee of the current invention have provided new designs that change or improve nearly every aspect of standard roller clutch operation. Roller clutch load and speed capabilities have been improved to match or exceed the capability of the more expensive and tolerance dependent sprag clutches. One of the ways that roller clutch load capacity has been increased is to use two rows of rollers. Two rollers side by side can provide the load capacity of a single roller that is twice as long, but without the tendency of a long single roller to overload in the center if it skews. In U.S. Pat. No. 4,664,237 Lederman et al, a roller clutch is disclosed in which a single cage contains multiple pairs of rollers, side by side. Each roller pair is located in a single cage pocket, along with a special two sided spring that energizes each roller independently. Thus, each roller can move freely to its own ready position on the common cam ramp. The ready position of each roller, that is, its position on the cam ramp, where it is in continual contact with both the cam ramp and the pathway, may be slightly different, since the rollers may have different diameters due to manufacturing variations.

Shipping security, skew control, and roller speed capacity have all been improved by the use of clutches with roller control cars. Each roller has an individual control car that surrounds the roller closely enough to retain it securely in the car. Each car, in turn, is retained to the cage by various means that prevent the car from separating from the cage before clutch installation, but which do not interfere with the free travel of the roller after clutch installation. The net result is a secure assembly for shipping and handling purposes, but each roller is still able to freely seek its lockup ready position between the races as the clutch operates. A basically conventional spring is used, which applies its energizing force to the car, instead of directly to the roller. In some designs, the control cars are also guided quite closely by the side rails of the cage as they slide between the side rails during clutch operation. Since the rollers are held square to the cars by the closeness of their fit within the cars, each roller is given a high degree of skew control during clutch operation. Controlling skew helps control spin and uneven loading of the rollers. In addition, various other means can be added to the car to reduce roller spin and wear, such as drag surfaces and rubbing surfaces which interact with the pathway race during clutch overrun. U.S. Pat. No. 4,821,856 to Lederman and U.S. Pat. No. 4,893,702 to Lederman show various embodiments of roller control cars embodying the above features.

The specific designs described above were developed for single row roller clutches. Double row clutches present the unique problem discussed above of potentially differing optimal ready positions within the same roller pair. The close containment that some of the roller control cars described above provide to the rollers would be a drawback if pairs of rollers were simply added to the car without alteration. The smaller roller could potentially be held back from reaching its optimal ready position. This could mean that one roller of the pair, the one held back, would see no load, overloading the other. Furthermore, none of the roller car designs discussed above is specifically designed to apply an energizing force to two rollers at once from a single spring.

SUMMARY OF THE INVENTION

The invention provides a control car type roller clutch with specially designed control cars that can accommodate pairs of rollers, providing the benefits of a control car while still allowing each roller to operate substantially independently.

In the preferred embodiment disclosed, a plurality of sloped cam ramps on a cam race face a cylindrical pathway race. The races are maintained substantially coaxial by a molded plastic cage installed between the races. The cage includes a plurality of rectangular roller car pockets, each of which is respective to a cam ramp. Each pocket has a pair of parallel side rails that remain square to the clutch axis, providing a fixed foundation relative to which other components move as the clutch operates.

Located within each cage pocket is a rectangular roller control car, each of which contains a pair of rollers side by side. One roller of each pair is assumed to be smaller than the other, or at least potentially so. Each roller is snap fitted between a pair of radially spaced ribs at the back of the car and one of a pair of convex, rounded rocker pads at the front of the car. Each roller thus has three point retention within the car, and is engaged by its particular rocker pad near the center of the roller. A releasable latch retains the cars to the pockets before installation, so a secure unit is created for shipping purposes. The rollers are not tightly held in the car, however. There is enough deliberate clearance between the rollers and the interior of the car so that each roller can rock back and forth about its rocker pad, which serves as a fulcrum. Similarly, the cars are not rigorously guided by the cage pocket side rails. There is enough deliberate clearance between the cars and the cage pocket side rails that each car can skew slightly within its cage pocket as the clutch operates. Each car is urged forward, that is, toward the lockup position of the rollers by a single, conventional energizing spring.

During clutch overrun, as the car is urged forward, each roller of each pair is also urged forward, indirectly, through its respective car rocker pad. Each roller can continue to receive energization toward the lockup position, even as the smaller of the two rollers moves farther forward, since each roller is allowed to rock about its own rocker pad without losing contact. The car skews as necessary within the cage pocket to allow each roller to be urged to its optimum equilibrium position, and the roller car clearance is sufficient not to interfere. Each roller therefore stays basically square to the clutch axis, even if the car does not, and each takes a full share of the load between the clutch races.

It is, therefore, a general object of the invention to provide a control car type roller clutch that will accommodate pairs of rollers.

It is another object of the invention to provide such a roller clutch in which a single spring acting on a roller control car can effectively urge each of a pair of rollers contained in the car toward its own independent equilibrium position during clutch overrun.

It is another object of the invention to provide such a roller clutch in which deliberately created clearances between the roller pairs and the cars that contain the rollers, and between the cars and the cage pockets that contain the cars, cooperate to allow each roller to be independently urged to its own lockup ready position without interference.

It is still another object of the invention to provide a roller car in which the rollers are retained to the cars, and the cars retained to the cage, in such a way that secure shipping retention is provided without interfering with the ability of each roller to attain its unique ready position.

DESCRIPTION OF THE PREFERRED EMBODIMENT

These and other objects and features of the invention will appear from the following written description, and from the drawings, in which.

Figure 1:
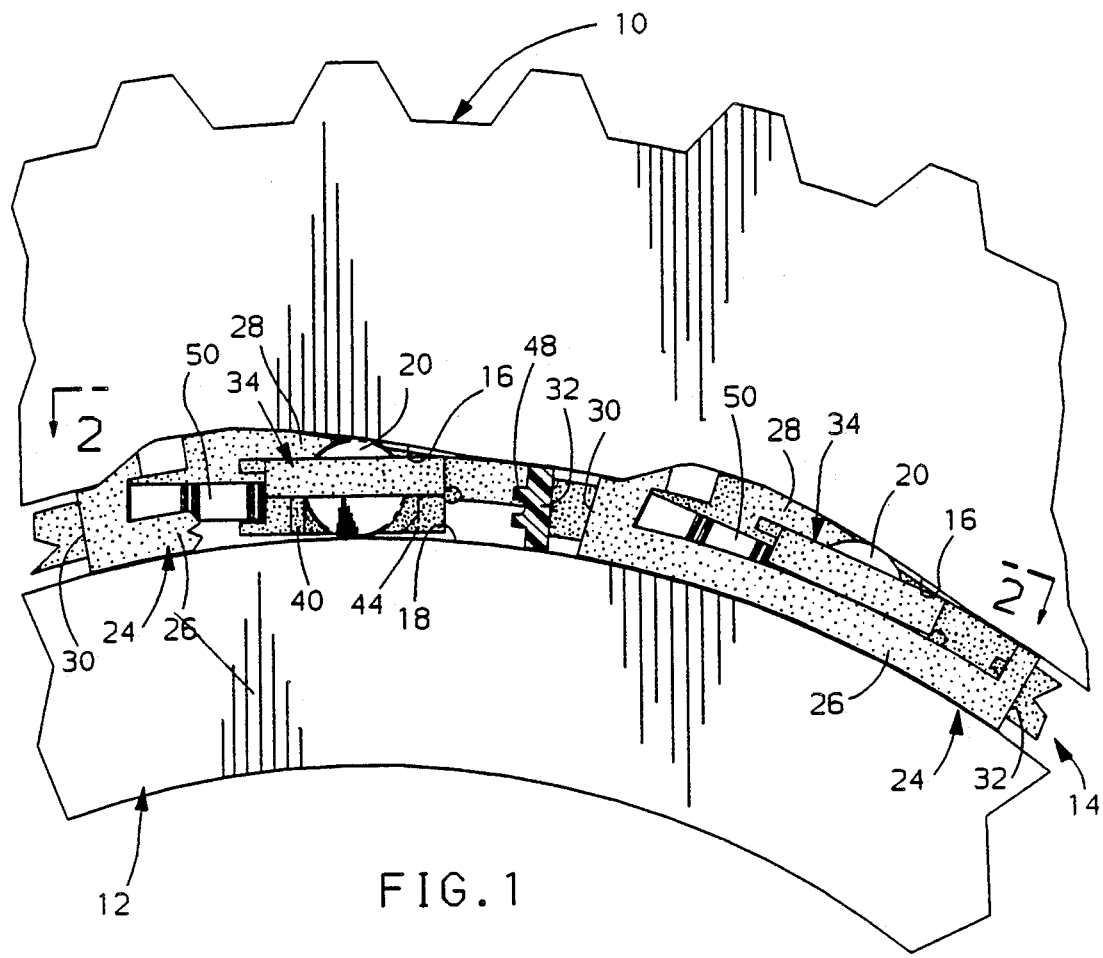
FIG. 1 is a view of part of a pair of clutch races with a preferred embodiment of the roller clutch of the invention installed.
Figure 8:
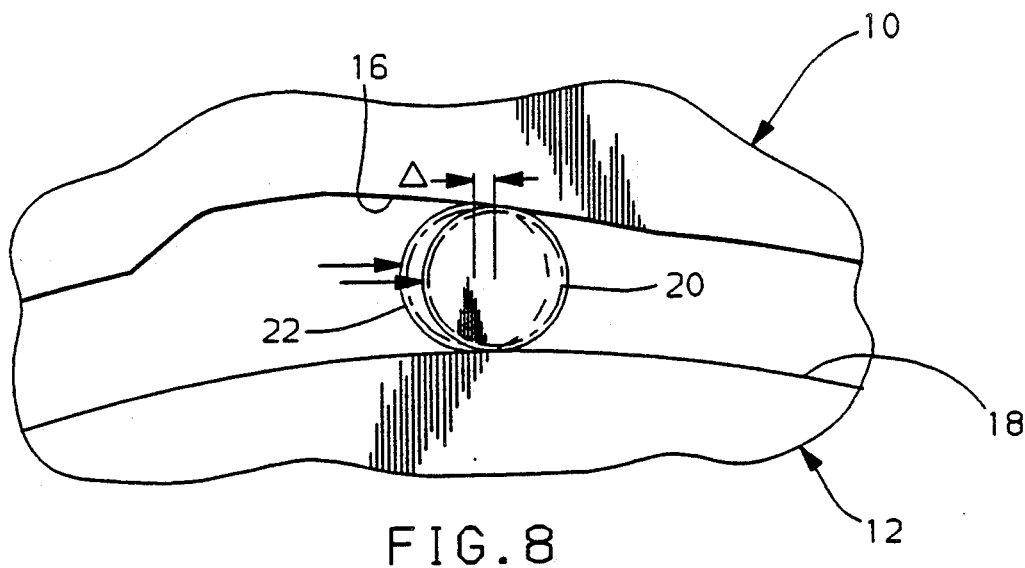
FIG. 8 is an enlarged view of a cam ramp and part of the pathway faces it, showing different optimum equilibrium positions for the rollers.

Referring first to FIGS. 1 and 8, an outer cam race, indicated generally at 10, and an inner pathway race, indicated generally at 12, are maintained in basically coaxial relation by a preferred embodiment of the roller clutch of the invention, indicated generally at 14. The inner surface of cam race 10 comprises an evenly circumferentially spaced plurality of sloped cam ramps 16, while the outer surface of pathway race 12 is a cylindrical pathway 18. After installation of clutch 14, the cam ramps 16 and pathway 18 face one another radially, as best shown in FIG. 8. However, clutch 14 is deliberately made to fit somewhat loosely, so as not to bind during installation. During the overrunning mode of clutch 14, some race eccentricity results from the installation clearance, and the camp ramps 16 and pathway 18 move rapidly together and apart. In the lockup mode, wedging elements jam between the cam ramps 16 and pathway 18, maintaining the races 10 and 12 rigidly radially spaced relative to one another. It is the wedging elements, described next, that also absorb the loads between the races 10 and 12 in the lockup mode.

Referring next to FIG. 8, the wedging elements that create lockup are a plurality of cylindrical steel rollers, specifically a plurality of pairs of rollers 20 and 22. The roller pairs 20 and 22 are located side by side with closely spaced inner ends, and are basically identical. Nevertheless, it is likely that one roller of each pair, such as roller 20, will be undersized compared to the other, due to ordinary manufacturing and grinding tolerances. Each roller 20 and 22 must have an energizing force, provided as described below, that continually urges it in the direction shown by the arrows. Thus, in the overrun mode, each roller 20 and 22 is continually urged toward contact with both the cam ramp 16 and the pathway 18, maintaining an equilibrium position where it is ready to quickly, efficiently jam between the races 10 and 12. The undersized roller 20, if allowed to move without interference, will naturally find a unique, optimum equilibrium position on the cam ramp 16 that is ahead of the larger roller 22, a difference in position indicated as $\Delta$. If allowed to attain its own particular optimum position, without interference, then each roller 20 and 22 will stay square to the axis of roller clutch 14, and each will see a basically equal share of the load between the races 10 and 12. The degree of size difference and equilibrium position difference $\Delta$ is deliberately exaggerated, shown as about 10–15% of the roller diameter for purposes of illustration. Even small differences can have a significant effect, however. Moreover, tolerance variations in the grinding of the cam ramps 16 may have an additive effect, along with the roller diameter difference, in causing differing roller ready positions. The invention allows each roller 20 and 22 to attain its particular optimum ready position, as will be described below.

Figure 2:
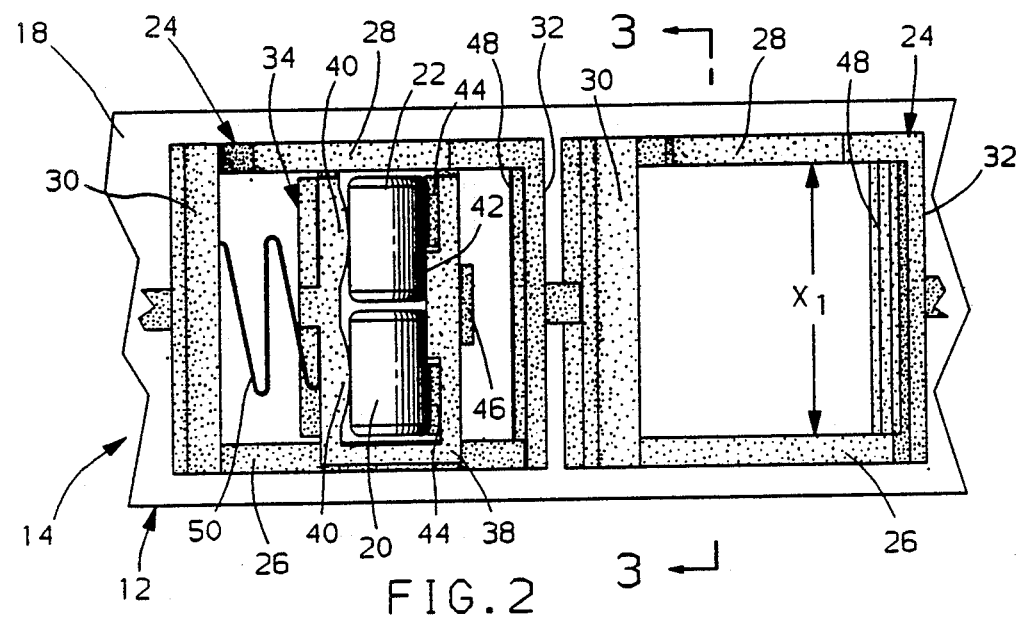
FIG. 2 is a view taken along the line 2—2 of FIG. 1, showing in addition an empty cage pocket.
Figure 3:
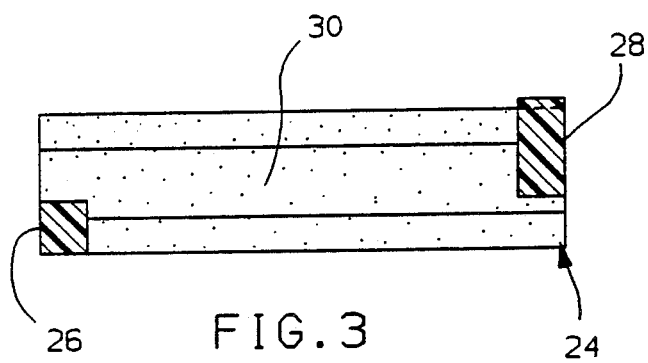
FIG. 3 is a sectional view of the empty cage pocket taken along line 3—3 of FIG. 2.
Figure 4:
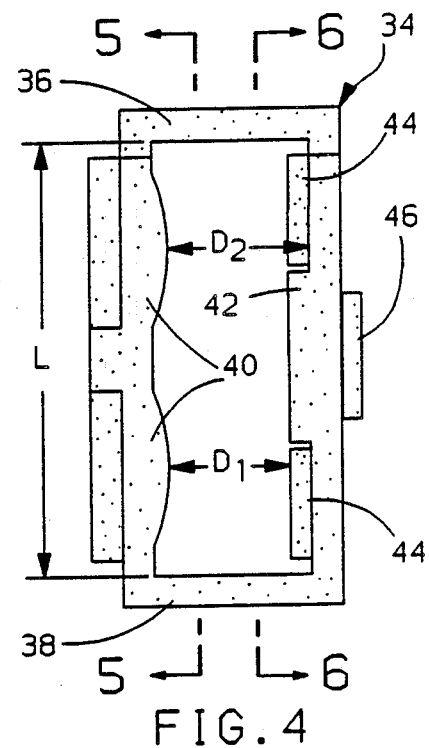
FIG. 4 is a plan view of an empty control car removed from roller clutch.
Figure 5:
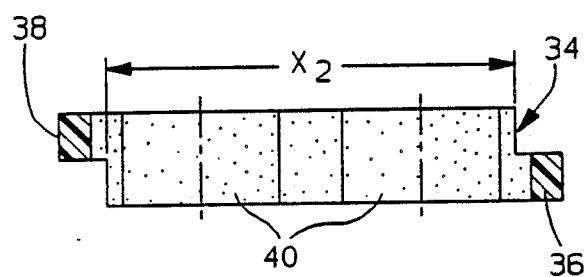
FIG. 5 is a sectional view of the empty control car taken the line 5—5 of FIG. 4.
Figure 6:
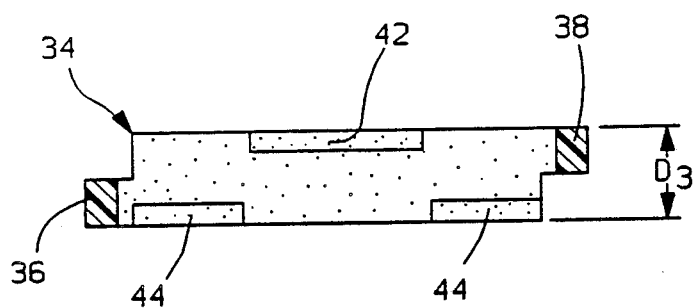
FIG. 6 is a sectional view of the empty control car taken line 6—6 of FIG. 4.

Referring next to FIGS. 2 through 3, the basic framework of clutch 14 is a molded plastic cage that consists of an evenly circumferentially spaced series of cage pockets, each of which is indicated generally at 24. Each cage pocket 24 serves several functions. It is adapted to be non-turnably fixed to cam race race 12 when clutch 14 is installed, and maintains the races 10 and 12 spaced apart and substantially coaxial. The cage pockets 24 remain square to the axis of clutch 14, and each is aligned with and sits under a respective cam ramp 16 without moving appreciably as clutch 14 operates. The fixed pockets 24, therefore, provide an axial, radial and circumferential framework for measurement between the races 10 and 12. The pockets 24 also provide a foundation to which other components may be assembled, and from which they can derive guidance as clutch 14 operates. Each pocket 24 is four sided, with a lower side rail 26, upper side rail 28, front cross bar 30 and rear cross bar 32. Pocket 24 is molded by an axially parting bypass technique, so the side rails 26 and 28 are parallel, but occupy no common radial area, as best shown in FIG. 3. The axially measured separation of the inner surfaces of side rails 26 and 28, indicated at $X_1$, bears a deliberate relation to another component, described next.

Referring next to FIGS. 4 through 7, clutch 14 also includes an equal plurality of molded plastic roller control cars, one of which is indicated generally at 34. Each car 34 is a basic rectangular box, molded by a radially parting bypass technique, with an axially measured interior length L that is about 10% more than the total length of rollers 20 and 22. Each car 34 has a basic axial dimension $X_2$ that is about 10% less than $X_1$. Extending axially out from the sides of car 34 are lower and upper side flanges 36 and 38. A pair of rocker pads 40 have a rounded, convex shape, and are molded integrally to the front interior of car 34. Pads 40 may be considered to have ridge lines, shown by dotted lines in FIG. 5. Because of the way car 34 is molded, the ridge lines of the rocker pads 40 can be made as long as the car 34 is thick. The ridge lines are axially separated by slightly more than a roller length. Three retention ribs are molded at the back interior of car 34, a longer central upper rib 42 flanked by two shorter, coplanar lower ribs 44, all three of which have no axial overlap. There is a deliberate spatial relationship between the interior dimensions of car 34 and the rollers 20 and 22, which, for the purposes of describing car 34, can be considered to have the same basic roller diameter. The least separation between the rocker pads 40 and the retention ribs 42 and 44, measured circumferentially, is slightly less than the roller diameter, and indicated at $D_1$. The greatest circumferentially measured separation, $D_2$, is approximately 10-15% greater than the roller diameter. The greatest radially measured separation between the upper rib 42 and the lower ribs 44, $D_3$, is approximately 25% less than the roller diameter. Finally, a cylindrical male latch member 46 molded to the back exterior of car 34 is sized so as to fit yieldably into a matching female latch member 48 molded to the inside of cage pocket rear cross bar 32.

Figure 7:
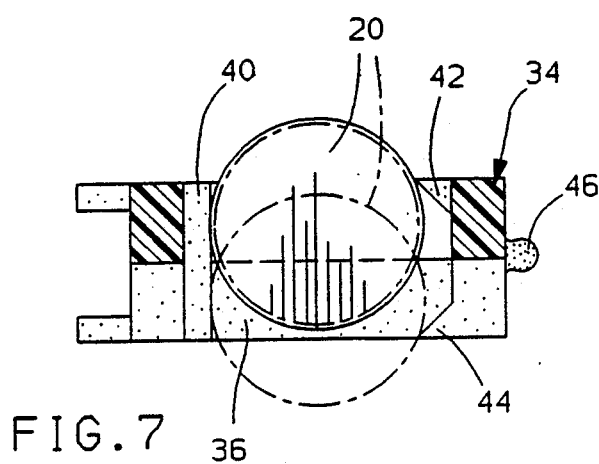
FIG. 7 is a view showing how a roller is captured in a control car.

Referring next to FIGS. 2 and 7, it may be seen how the structures described above and their dimensional interrelationships to the rollers 20 and 22 allow clutch 14 to be assembled and handled as a secure unit. A pair of rollers 20 and 22 can be snap fitted into the interior of a car 34, since the plastic from which it is molded has some inherent resilience. As seen in FIG. 2, there is both axial and circumferential clearance between the rollers 20 and 22 and the interior of car 34. Therefore, the rollers 20 and 22 are not tightly confined within car 34, nor would they be rigorously guided by car 34. Nevertheless, the rollers 20 and 22 are captured and retained in car 34 against fallout, as shown in FIG. 7. If a roller 20 or 22 moves radially in or out, the allowed limits of which are shown in solid and dotted lines in FIG. 7. Moving radially out, either roller 20 or 22 will hit its respective rocker pad 40 and one end of the upper retention rib 42. Moving radially in, either roller 20 or 22 will hit its respective rocker pad 40 and one of the lower ribs 44. After the car 34 has been filled, it is placed into a respective pocket 24 with the car side flanges 36 and 38 overlapping the pocket side rails 28 and 26 respectively. Because of the significant $X_1$, $X_2$ differential, the overlap is not sufficient to securely retain car 34 in pocket 24. However car 34 is retained securely in its cage pocket 24, prior to installation, by pushing the male latch member 46 into the female latch member 48. Completing clutch 14, a conventional energizing spring 50 is compressed between the front of each car 34 and its respective cage pocket front cross bar 30. All components are thereby retained together as a secure, shake proof unit for shipping and handing. The latch members 46 and 48 are released when clutch 14 is installed between the races 10 and 12, as described in the above cited U.S. Pat. No. 4,821,856, incorporated herein by reference.

Referring next to FIGS. 2 and 8, it may be seen how the structures and dimensional relationships described above cooperate during clutch operation. In the overrun mode of clutch 14, if there were no significant tolerance variations, then each roller 20 and 22 would seek the same ready position, as shown in FIG. 2. Spring 50 would push car 34 to the right. Each rocker pad 40 would transfer the force of spring 50 to the approximate center of a respective roller 20 or 22, and urge it up cam ramp 16 and into pathway 18, ready to lock up. Car 34 could slide freely between the pocket side rails 26 and 28, allowing the rollers 20 and 22 to move freely back and forth, up and down the common cam ramp 16, to accommodate the race eccentricity referred to above. In reality, the tolerance variations described above would likely impel the rollers 20 and 22 to seek the differing optimum ready positions described in FIG. 8. The rollers 20 and 22 could achieve this provided they received continual, balanced energizing force toward the ready position, and were not hindered in their motion. Roller car 34 is designed to do just that, as is described next.

Figure 9:
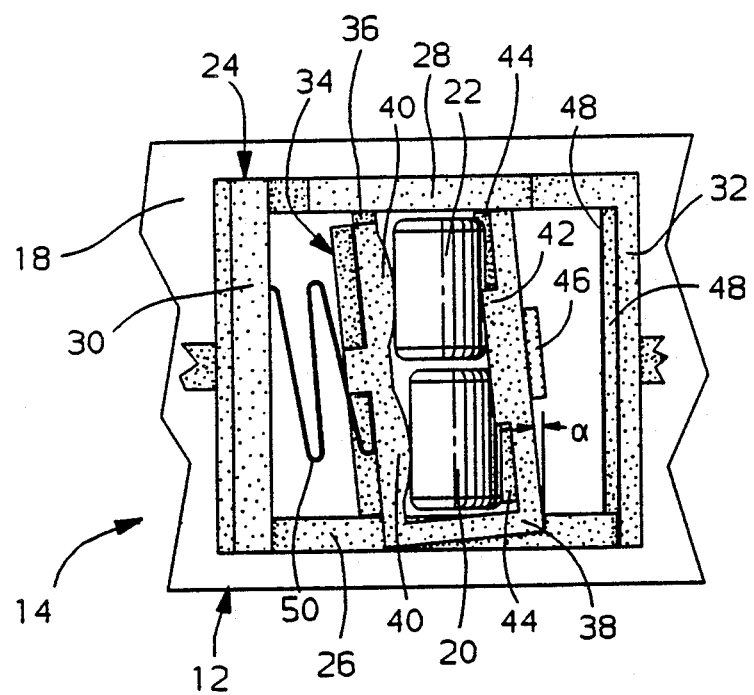
FIG. 9 is a view like FIG. 2, but showing the rollers during clutch operation.

Referring next to FIGS. 8 and 9, it may be seen how car 34 operates relative to rollers 20 and 22. As the smaller roller 20 starts forward to its advanced ready position, each roller 20 and 22 can pivot in see-saw fashion relative to car 34 about rocker pads 40. Or, as seen relative to the fixed reference frame of cage pocket 24, the car 34 pivots on the rollers 20 and 22 about its rocker pads 40, while the rollers 20 and 22 stay square to the axis of clutch 14 and parallel to one another. However described, the maintenance of contact between the rocker pads 40 and the rollers 20 and 22 is what will assure that each can be continually urged forward into ready position, albeit indirectly, by a more or less equal share of force from the single spring 50. The car 34-cage pocket 24 clearance described above, $X_1$-$X_2$, is sufficient to allow car 34 to tilt or skew within pocket 24 enough that such contact can be maintained without hindrance. Here, the car 34-pocket 24 clearance allows a tilt angle $\alpha$ of about 5 degrees, which is sufficient. For a given roller length, the degree of tilt angle $\alpha$ necessary will increase with $\Delta$, and for a given $\Delta$, $\alpha$ will decrease with increasing roller length. Furthermore, the clearance of rollers 20 and 22 from the interior of car 34 prevents the interior of car 34 from binding on the rollers as car 34 tilts. The objective here is not that the rollers 20 and 22 be confined closely within the car 34, or that the car 34 be absolutely rigorously guided by the cage pocket side rails 26 and 28, although the rollers 20 and 22 are, of course, confined, and the car 34 receives some guidance. For example, the rollers 20 and 22 would not have the potential to skew within pocket 24 to the degree they could if they were not contained in a control car 34 at all. Rather, the objective is that each roller 20 and 22 be assisted toward its unique equilibrium position during overrun, without hindrance, so as to remain in contact with both cam ramp 16 and pathway 18, square to the axis of clutch 14. Each roller 20 and 22 is thus optimally positioned to support an adequate share of the load between the clutch races 10 and 12.

Variations in the preferred embodiment could be made. Most broadly, a control car without the retention ribs 42 and 44 or the latch members 46 and 48, but with the same internal and external clearances, could be used. Such a simplified control car would still allow a single spring to continually urge both rollers 20 and 22 toward their unique, optimum ready positions, and would still provide a measure of skew control to the rollers, although no shaping retention. It is a great advantage, however, if the control car does more than just contain the rollers, and also retains the rollers against fallout during shipping. Any retention means that held the rollers in the car, and which held the cars slidably within the cage pocket with enough clearance to allow the control car to tilt to the necessary degree, would provide for secure shipping retention without interfering with the main objective of allowing each roller 20 and 22 to attain its own ready position. For example, mechanical means other than the latching members 46 and 48 could be used to retain car 34 to cage pocket 24. Cooperating tabs and slots, or rails and tracks, formed on the exterior of car 34 and the interior of pocket 24, could slidably retain car 34 between the pocket side rails 26 and 28, so long as the basic $X_1-X_2$ differential described above was incorporated. An example of such an alternative retention means is found in U.S. Pat. No. 4,821,856, which provides very secure car-cage retention, but which requires a multi-piece cage construction. If car 34 were molded by an axially parting bypass technique, then retention ribs that ran the entire axial width of car 34 could be molded, just as the female latch member 48 runs the entire axial width of cage pocket 24. Retention ribs so molded could overlap both sides of both rollers 20 and 22 over their entire length, potentially providing more secure roller retention. However, molding car 34 by a radially parting bypass technique as disclosed allows the rocker pads 40 to have ridge lines as long as the car 34 is thick. This length is what allows the rocker pads 40 to cooperate in retaining the rollers 20 and 22 in car 34, providing the third point of retention contact no matter how far rollers 20 and 22 move in or out, as FIG. 7 illustrates. The ribs 42 and 44 are long enough, since the upper rib 42 overlaps one side of the inboard ends of both rollers 20 and 22, and the flanking lower ribs 44 overlap the other side of the roller outboard ends. Therefore, it should be understood that it is not intended to limit the invention to just the embodiment disclosed.

The embodiments of the invention in which an exclusive property or privilege is claimed are defined as follows:

1. An overrunning clutch of the type that is adapted to be installed between a cam race having a series of sloped cam ramps and a cylindrical pathway of a coaxial pathway race, said clutch comprising, a series of pairs of cylindrical rollers, each pair respective to a cam ramp, one of which has a smaller diameter so as to advance ahead of the larger roller when each roller is maintained in a ready position in contact with both said pathway and its respective cam ramp during clutch operation, a cage adapted to be non-turnably fixed to said cam race when said clutch is installed, said cage having a series of generally rectangular pockets, each of which is substantially square to said clutch axis and aligned with a respective cam ramp, a series of generally rectangular roller control cars, each of which contains a pair of rollers and is in turn slidably contained within a respective cage pocket, each of said control cars also having a pair of rocker pads formed on its interior engageable with a respective roller near the center thereof, said control car further having enough interior clearance from said rollers and enough exterior clearance from said cage pocket to allow said rollers to pivot about said rocker pads as each roller attains its particular ready position, and, a series of energizing springs, each compressed between a respective control car and cage pocket so as to continually urge said control car toward said rollers' ready positions and thereby maintain said rocker pads in continual contact with said rollers, whereby, each roller is urged toward ready position by a share of the force of one of said springs during clutch operation.

2. An overrunning clutch of the type that is adapted to be installed between a cam race having a series of sloped cam ramps and a cylindrical pathway of a coaxial pathway race, said clutch comprising, a series of pairs of cylindrical rollers, each pair respective to a cam ramp, one of which has a smaller diameter so as to advance ahead of the larger roller when each roller is maintained in a ready position in contact with both said pathway and its respective cam ramp during clutch operation, a cage adapted to be non-turnably fixed to said cam race when said clutch is installed, said cage having a series of generally rectangular pockets, each of which is substantially square to said clutch axis and aligned with a respective cam ramp after installation, a series of generally rectangular roller control cars, each of said control cars having a retention means that holds a respective pair of rollers in said car before installation with sufficient internal clearance that each roller may attain its particular ready position without interference during clutch operation, each of said cars further having a pair of rocker pads formed on its interior engageable with a respective roller near the center thereof, means retaining each of said control cars in a respective cage pocket before installation with enough external clearance that said control car can slide within said cage pocket and tilt within said cage pocket sufficiently during clutch operation to allow said rollers to pivot about said rocker pads as each roller attains its particular ready position, a series of energizing springs, each compressed between a respective control car and cage pocket so as to continually urge said control car toward said rollers' ready positions and thereby maintain said rocker pads in continual contact with said rollers during clutch operation, whereby, said rollers and control cars are retained to said cage securely prior to clutch installation, while each roller is urged toward ready position by a share of the force of one of said springs during clutch operation.

* * * * *